United States Patent [19]

Bliamptis

[11] 4,177,493

[45] Dec. 4, 1979

[54] HIGH VOLTAGE ANTENNA PROTECTION SYSTEM

[75] Inventor: Emmanuel E. Bliamptis, Lexington, Mass.

[73] Assignee: The United States of America as represented by the Secretary of the Air Force, Washington, D.C.

[21] Appl. No.: 865,753

[22] Filed: Dec. 29, 1977

[51] Int. Cl.² .............................................. H02H 7/20
[52] U.S. Cl. ........................................ 361/56; 333/12; 343/904; 361/117; 361/118; 361/133
[58] Field of Search ...................... 361/56, 54, 43, 118, 361/119, 117, 133, 134, 129, 212, 220, 221; 333/12, 17 L; 324/109; 343/720, 851, 904, 905, 906

[56] References Cited

U.S. PATENT DOCUMENTS

| | | | |
|---|---|---|---|
| 500,455 | 6/1893 | Wurts | 361/133 |
| 3,112,429 | 11/1963 | Person | 361/134 |
| 3,280,376 | 10/1966 | Person | 361/133 |

FOREIGN PATENT DOCUMENTS

171666 6/1952 Fed. Rep. of Germany ........... 361/133

Primary Examiner—Patrick R. Salce
Attorney, Agent, or Firm—Joseph E. Rusz; Henry S. Miller

[57] ABSTRACT

A device for the protection of antennas against lightning and electromagnetic pulse consisting of an electrically conducting rotor that is free to turn on a conducting shaft which is connected to the antenna. This combination is placed within an electric coil with one end connected to ground. The rotor is mounted eccentrically within the coil so that when a predetermined critical voltage on the antenna is exceeded electrical current flows through the rotor, and coil to ground via the air gap separating the rotor and coil, a magnetic field is set up in the coil which turns the rotor and reduces the air gap as the voltage is dissipated, after discharge of the surge, the rotor returns to its quiescent position.

5 Claims, 2 Drawing Figures

HIGH VOLTAGE ANTENNA PROTECTION SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a system for the protection of antennas and like devices from lightning and high energy electromagnetic pulses and more specifically to such a system that is more reliable and efficient than any system presently known.

There currently exists a number of different methods and means for controlling and directing the high voltage space discharge that comes from lightning. Similarly, an electromagnetic pulse generated as the result of a nuclear explosion which produces the same effect as lightning is controlled by these devices. Further, in the case of large antennas, there are circumstances under which electrostatic charge will become a factor in operation of equipment associated with the antenna and control of this energy is required.

One system currently available involves the utilization of a pair of metalic spheres located between a collector line and ground. These spheres are spaced at an optimum distance where after the buildup of a predesignated voltage, there will be a discharge across the gap to ground. The disadvantages of this system include the fact that the spheres rapidly become pitted at the point of discharge and must be replaced frequently. Similarly, it is difficult to set and maintain the gap between the spheres insuring complete and proper discharge for critical voltage buildups. In addition, in periods of foul weather, rain, snow and ice will effect the proper operation of these systems and could cause destruction of the system in the event of being struck by lightning.

The invention presented herein avoids all the disadvantages of the prior art and presents a new and more efficient system for protecting antennas and similar devices from bursts of high voltage.

SUMMARY OF THE INVENTION

The device described herein is for the protection of any electrically charged bodies which ordinarily operate at high voltages and may not be grounded permanently against spurious overvoltages such as those associated with intense atmospheric ionization leading to lightning and with electromagnetic pulse.

In accordance with this invention, a lightweight electrically conducting rotor is connected to a shaft. The rotor is free to turn on the shaft which in turn is connected to the antenna or device to be protected. The rotor and shaft are situated in a housing consisting of a conducting inner lining, an electric coil, a ferromagnetic sheath and an insulating end support. One end of the electric coil is connected to the conducting lining while the other end is connected to ground (earth).

The rotor, under quiescent conditions, allows a uniform gap between it and the lining. When a predetermined critical voltage on the protected device is exceeded, electric current flows from the antenna, through the rotor, gap, and coil to ground, and simultaneously sets up a magnetic field in the housing.

The magnetic field acting on the electric current in the rotor, generates a torque thereby turning the rotor. Since the rotor is mounted eccentrically with respect to the housing, as it rotates, the gap length is decreased, the final gap being a small fraction of its original length, and the excess charge/voltage on the protected device then finds a much shorter path to ground. After discharge of the surge, the rotor returns to its quiescent position.

It is therefore an object of the invention to provide a new and improved system for protecting antennas and like devices from high voltage and electromagnetic pulses.

It is another object to provide a new and improved high voltage protection system that has a faster response than any known similar device.

It is a further object of the invention to provide a new and improved high voltage protection system that gives a complete discharge for critical voltage buildups.

It is still another object of the invention to provide a new and improved high voltage protection system that has an indefinitely long life.

It is still a further object of the invention to provide a new and improved high voltage protection system that is inherently reliable.

It is another object of the invention to provide a new and improved high voltage protection system that is unaffected by weather conditions.

It is another object of the invention to provide a new and improved high voltage protection system that is unaffected by pitting and is more easily maintained than similar systems.

These and other advantages, features and objects of the invention will become more apparent from the following description taken in connection with the illustrative embodiment in the accompanying drawings.

DESCRIPTION OF THE PREFERRED EMBODIMENT

Figure 1:
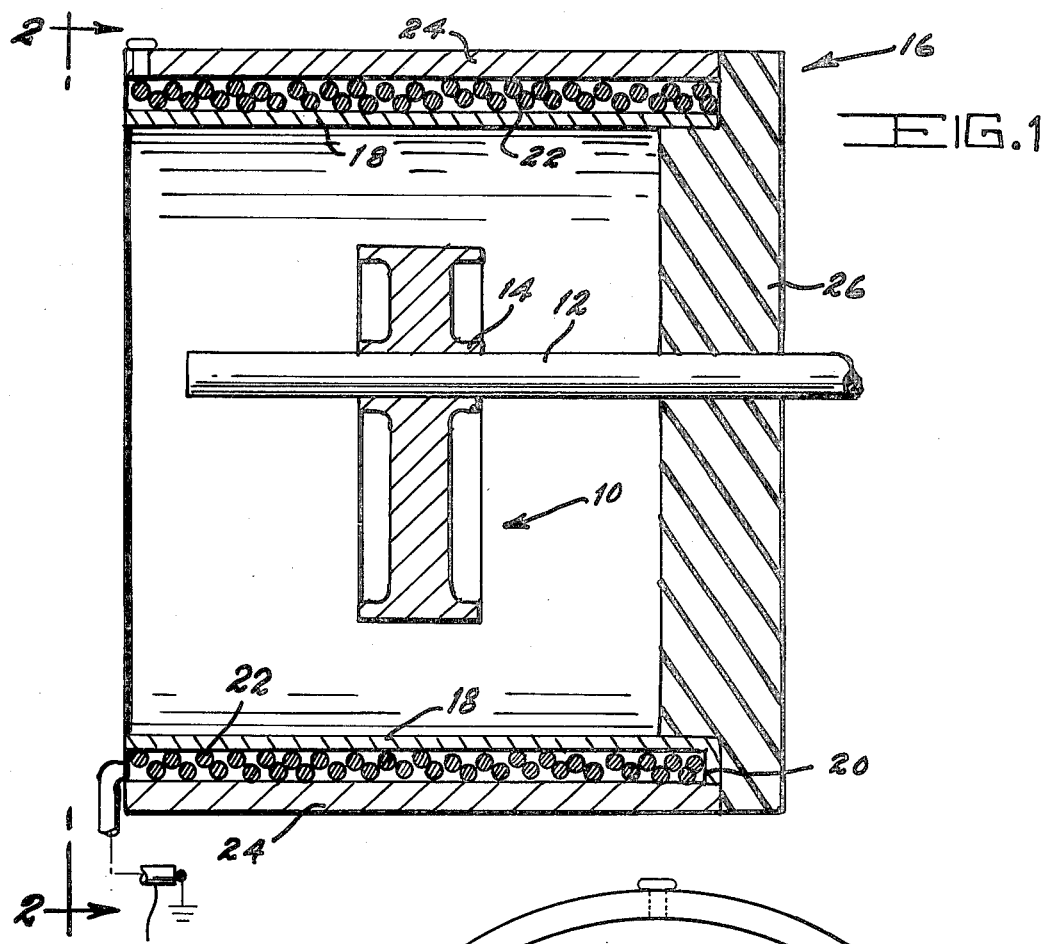
FIG. 1 is a crosssectional view of the invention.

Referring now to FIG. 1, the invention consists of a light weight electrically conducting rotor shown generally at 10. The rotor is mounted eccentrically on a shaft 12 and is free to rotate about the shaft without benefit of any specially provided bearing surfaces. A hole 14 is drilled through the rotor of sufficiently close tolerance to assure freedom of motion between the rotor and shaft. The combination of rotor 10 and shaft 12 is placed in a housing shown generally at 16, which surrounds the rotor concentrically. The inner surface 18 of the housing is formed of a conducting lining which is connected at one end (20) to an electric coil which surrounds the lining and the rotor-shaft assembly. An outer sheath 24, composed of ferromagnetic material serves as a low magnetic reluctance path for the magnetic flux generated when electric current flows through coil 22. An insulating end plate 26 provides support to the rotor assembly and maintains the relative dimension of the unit. The remaining end of coil 22 is connected to ground (earth) via cable 28.

Small segments of rotor circumference may be removed in two locations, A, C, so that secondary circulation of charge is prevented. In an alternate form, the rotor eliminates the upper portion of the rotor circumference (arc ABC). This form of rotor uses less material and permits the termination of the arc ends at A and C to be pointed so that the emmission of charge is facilitated.

Figure 2:
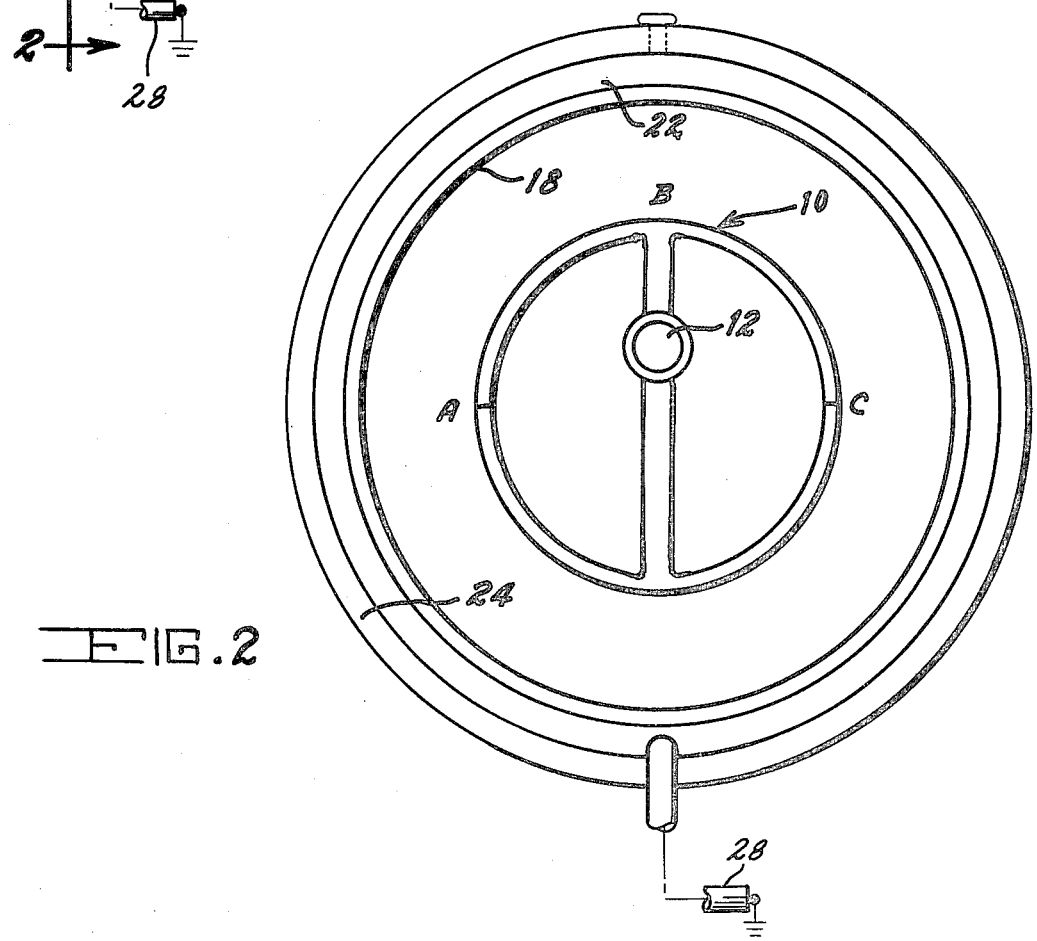
FIG. 2 is a view of the invention taken along line 2—2 in FIG. 1.

The rotor may be placed in position and removed by merely sliding on or off the shaft. Accidental removal of the rotor may be prevented by a straight cotter pin at the free end of the shaft. Under quiescent conditions, the rotor is suspended in a pendulous manner from the shaft depicted in FIG. 2, and allows a uniform air gap between it and the inner lining. When the rotor is turned by 180°, the gap is reduced to 10% of its quiescent value. Whenever a predetermined critical voltage on the antenna (directly connected to the shaft) is exceeded, a small current begins to flow through the shaft, rotor, air gap, lining and coil to the ground thereby setting up an axial magnetic field inside the housing. This magnetic field, acting on the radial current flowing in the rotor produces a torque, T, on the rotor which is equal to $$T = \int BrIdr$$

Where:
B is the magnetic induction
I is the electric current
r is the effective distance of the current element Idr from the rotation axis.

Taking into account the current flowing into the long and short rotor spokes, of lengths $R_1+a$ and $R_1-a$, respectively, the torque becomes $$T = 2\eta 10^{-7} NI^2(R_1^2 + a^2)$$

where all the quantities are in the international system of units (SI). As an example, for a current of about 100 amperes, a coil of 100 turns and the dimensions of FIGS. 1 and 2 the net torque is approximately 0.02 meter-newton (or 2.8 ounce-inches) which is sufficient to turn the rotor (eq. a 50 gram rotor will be totaled by 180° in less than 130 milliseconds). The design of the device is such that as the rotor turns, the gap shortens, thus current can flow and the antenna is quickly and safely discharged. After discharge, the rotor returns to its original quiescent position.

Although the invention has been described with reference to a particular embodiment, it will be understood to those skilled in the art that the invention is capable of a variety of alternative embodiments, within the spirit and scope of the appended claims.

What is claimed is:

1. An apparatus for the protection of electrically charged bodies against spurious overvoltages comprising a cup shaped housing; an electrically conductive shaft extending through one end of the housing, parallel to, but spaced away from the longitudinal axis of the housing; rotor means mounted on the shaft so that rotation of said rotor results in a progressively diminished air gap between the rotor and housing; means for connecting the shaft to an electrically charged body, and means for connecting the housing to ground.

2. An apparatus for the protection of electrically charged bodies according to claim 1 wherein said rotor is free to turn on said shaft.

3. An apparatus for the protection of electrically charged bodies according to claim 1 wherein said housing further includes an inner (electrically conductive) and an outer (magnetically permeable) wall having an electrical coil positioned therebetween.

4. An apparatus for the protection of electrically charged bodies according to claim 3 wherein one end of said coil is connected to the housing and the other end is connected to ground.

5. An apparatus for the protection of electrically charged bodies according to claim 3 wherein said rotor rotates in response to torques generated by the flow of current in said electrical coil and rotor thereby reducing the air gap between rotor and housing and facilitating the discharge of undesired over voltages present in said electrically charged bodies.

* * * * *